(12) United States Patent
Schwam

(10) Patent No.: US 6,994,071 B2
(45) Date of Patent: Feb. 7, 2006

(54) TWO-CYCLE ENGINE FOR COUNTER-ROTATION ESPECIALLY FOR AVIATION APPLICATIONS

(76) Inventor: Paul A. Schwam, 510 N. Stone Ave., Tucson, AZ (US) 85705

( * ) Notice: Subject to any disclaimer, the term of this patent is extended or adjusted under 35 U.S.C. 154(b) by 10 days.

(21) Appl. No.: 10/884,572

(22) Filed: Jul. 2, 2004

(65) Prior Publication Data

US 2005/0098143 A1 May 12, 2005

Related U.S. Application Data

(63) Continuation-in-part of application No. 10/417,364, filed on Apr. 16, 2003, now Pat. No. 6,761,144.

(60) Provisional application No. 60/520,134, filed on Nov. 15, 2003, provisional application No. 60/381,625, filed on May 17, 2002.

(51) Int. Cl.
 B64C 11/00 (2006.01)
 B64C 27/00 (2006.01)
 F02B 53/00 (2006.01)

(52) U.S. Cl. .................... 123/242; 123/44 C; 416/128; 416/129; 418/161; 418/164

(58) Field of Classification Search ................ 123/242, 123/44 R, 44 C; 416/128, 129; 418/161, 418/164
See application file for complete search history.

(56) References Cited

U.S. PATENT DOCUMENTS

| | | | |
|---|---|---|---|
| 1,052,658 A | 2/1913 | Escher |
| 1,151,568 A | 8/1915 | Conill |
| 1,461,436 A | 7/1923 | Arrigoni |
| 1,561,424 A | 11/1925 | Exel |
| 1,594,035 A | 7/1926 | Bailey |
| 1,841,841 A | 1/1932 | Munn |
| 2,336,787 A | 12/1943 | Hockney |
| 2,419,787 A | 4/1947 | Muffly |
| 2,838,123 A | 6/1958 | Olcott |
| 2,988,065 A | 6/1961 | Wankel et al. |
| 3,554,666 A | 1/1971 | Conkle |
| 3,602,203 A | 8/1971 | Mowry |
| 3,799,473 A | 3/1974 | Bortel |
| 3,933,324 A | 1/1976 | Ostrowski |
| 4,056,746 A | 11/1977 | Burtis |

(Continued)

FOREIGN PATENT DOCUMENTS

FR 397499 5/1909

*Primary Examiner*—Sheldon J Richter

(57) ABSTRACT

A counter-rotating 2 cycle piston engine with a combustion chamber and an output shaft rotatably mounted to rotate independently about the same propeller centerline of an aircraft. The Internal combustion power is transmitted to the output shaft by means of a conventional piston, rod, crankshaft configuration journaled to the combustion chamber or engine block in the traditional manner thereby producing concurrent rotation of the shaft and counter-rotation of the engine block. Interior surfaces of the combustion chamber and pistons are angled to control the oil flow inside the crankcase and eliminate unwanted ponding. The pistons are modified to transfer fluid accumulations to the combustion chamber. A throttle is located at the axis of rotation to function normally without the effects of centrifical force. Dual propellers mounted on the shaft and on the block improve thrust performance, balance the torques and moments of inertia of the two counter-rotating masses, All rotational output torque automatically balances itself between counter rotating propellers and is converted into propulsion. No rotational torque is allowed to be transmitted to the airframe through the counter-rotating engine mount.

17 Claims, 8 Drawing Sheets

U.S. PATENT DOCUMENTS

| | | |
|---|---|---|
| 4,916,892 A | 4/1990 | Pope |
| 4,997,414 A | 3/1991 | Camara et al. |
| 5,112,191 A | 5/1992 | Strock et al. |
| 6,193,189 B1 | 2/2001 | Keever |
| 6,220,906 B1 | 4/2001 | Dubois |
| 6,761,144 B2 * | 7/2004 | Schwam ..................... 123/242 |

* cited by examiner

TWO-CYCLE ENGINE FOR COUNTER-ROTATION ESPECIALLY FOR AVIATION APPLICATIONS

RELATED APPLICATIONS

This application is based on U.S. Provisional Application No. 60/520,134, filed Nov. 15, 2003, and is a continuation-in-part of U.S. application Ser. No. 10/417,364, now U.S. Pat. No. 6,761,144 filed on Apr. 16, 2003, which is based on U.S. Provisional Application No. 60/381,625, filed on May 17, 2002.

BACKGROUND OF THE INVENTION

1. Field of the Invention

This invention is related in general to the field of counter-rotating engines and, in particular, to a novel configuration for a 2 cycle engine with a novel mounting system, and one or more sets of simultaneously firing cylinders, that enables the advantageous counter-rotation of the engine's shaft and block for suitable applications.

2. Description of the Related Art

All internal combustion engines share the characteristic of transforming the pressure generated by the combustion of a fuel into the useful rotation of a shaft. Piston engines cause the rotation of the shaft by expanding the combustion gases between a stationary cylinder and a movable piston connected to the eccentric of a rotating output shaft.

Thus, in typical applications the engine is firmly mounted on a support structure and delivers power to a useful load by means of a rotating output shaft. In aviation applications, the engine is attached to the body of the aircraft and a propeller is mounted on the shaft to produce propulsion. As a result of the torque produced by the operation of the engine on the rotating shaft and propeller, an opposite reactive torque is produced on the stationary parts of the engine and is transmitted to the frame of the airplane to which it is attached.

Aviation engineers have long searched for ways to reduce the instability that results from this reactive torque. One way has been to provide two propellers that rotate in opposite directions to produce symmetrical counter-balancing actions and reactions, either in twin-engine or in single-engine configurations. The twin-engine solution can obviously be implemented with any kind of power plant, including reciprocating-piston engines, simply by providing opposite directions of propeller rotation in each engine.

See, for example, the solutions provided by Escher (U.S. Pat. No. 1,052,658), Conill (U.S. Pat. No. 1,151,568), Exel (U.S. Pat. No. 1,561,424), Hockney (U.S. Pat. No. 2,336,787), Muffly (U.S. Pat. No. 2,419,787), Olcott (U.S. Pat. No. 2,838,123), Conkle (U.S. Pat. No. 3,554,666), Keever (U.S. Pat. No. 6,193,189), Canton (French Patent No. 397,499), Warren (U.S. Pat. No. 6,209,495-B1), Zornes (U.S. Pat. No. 5,456,076), and Mouton (U.S. Pat. No. 5,535,715). None of these patents describe engines which wherein the internal fluid flows are deliberately directed toward the combustion chamber by centrifical forces my manipulating the internal surfaces defining the engine intake manifolds and crankcase volumes as described in the present invention.

The majority of these patents describe predominantly 4 cycle reciprocating-piston engines designed to balance opposing torque, either by means of two counter-rotating output shafts connected to multiple crankshafts originating from a stationary enclosure, or by a rotating crankshaft cooperating with a counter-rotating combustion-chamber enclosure. All of the various solutions disclosed in these patents involve complicated engine mounting, inlet/exhaust porting and lubricating systems that have greatly affected their practical implementation.

The single-engine, counter-rotating propeller propulsion solution has been explored in aviation technology by allowing both the rotation of the crankshaft and the counter-rotation of the cylinders of a reciprocating-piston engine. This approach involves counter-rotating structures (engine block and crankshaft) which support two propellers rotating in opposite directions to each other, which results in a greater amount of propelling force and a substantially perfect torque balance. To that end, the combustion-chamber/crankcase configuration of internal-combustion engines has been modified in various manners over the years attempting to attain a well balanced counter-rotating propeller system.

Some engines, reciprocating piston or otherwise, are more suitable than others for counter-rotation. Four cycle piston engines are an example of an engine type unsuitable for block counter-rotation. The mechanical configuration of 4 cycle reciprocating-piston engines, which comport the use of pistons traveling radially with respect to the axis of rotation of the crankshaft, and include one or more reservoir of oil for lubrication, produce an inherently unsuitable engine. Each piston operates radially from a corresponding crank in the output shaft, access to the combustion chamber for fuel delivery is necessarily limited to the distal end of each cylinder, which creates access difficulties during rotation of the cylinders and intake flow difficulties since flow to the combustion chamber is necessarily against centrifical force.

Lubrication is similarly complicated by centrifical-force effects that cause crankcase oil, necessary for lubrication, usually pooled in a reservoir below the crankshaft and away from the pistons, to accumulate in various locations, away from the crankshaft, including behind the pistons. Centrifical force acting upon accumulations of oil at this location causes severe engine imbalances, and also directly opposes the desires action created from internal combustion. Accordingly, no counter-rotating engine has been successfully implemented commercially using 4 cycle reciprocating-piston configurations in spite of the theoretical advantages provided by this concept.

Different from 4 cycle piston engines, Two cycle engines are an example of an engine type suitable for block counter-rotation.

Two cycle piston engines do not employ the crankcase volume to contain a constant reservoir of lubricating oil. The lubricating oil is atomized with the fuel-air mixture and transits the crankcase providing lubrication en route to the combustion chamber. Although this eliminates the adverse effects of centrifical forces acting upon a constant reservoir of lubricating oil within the crankcase volume, cavities within the crankcase are still able to trap transit fluids which inhibit oil flow and create fluid build-ups and imbalances during engine operation. Current technology in the crank case design includes cavities and interior surfaces which during rotation are able to pool fluids such as fuel and oil against surfaces away from the center of rotation, most notably the back side of the piston faces. Reservoirs of oil under the influence of centrifical force adversely affects the balance of the crankcase and inhibits the reciprocating motion of the pistons.

It is noted full scale 2-cycle engines operate at substantially higher RPM's than optimum for propeller efficiency. Standard output shaft designs require a reduction gear ranging from 2:1 to almost 4:1. Because 2-cycle engines have a greater weight to power ratio than 4 cycle engines, they remain competitive with weight to power ratios of 4 cycle engines, even with the addition of a crankshaft speed reduction unit.

The only examples of counter-rotating 2 cycle piston engines are by model airplane enthusiast utilizing radically simplified 2 cycle model airplane engines; the Cox 0.049 2 cycle piston engines wherein the block revolutions are slow, the engines are small, and the propellers are small (requiring no rear reduction) and the centrifical forces are minimal. In this example, an unmodified 0.049 engine, equipped with a small propeller in its output shaft, is mounted, by the usual engine block motor mounts, to the center hub of a very large, helicopter type rotating propeller wherein the two propellers are concentric. The helicopter blade is counter pitched such that during normal engine operation the opposing torque produced by the engine is transmitted to the helicopter blade and dissipated into the air as thrust by turning the helicopter blade. In this configuration the helicopter blade and the attached engine block are turning substantially slower and the distance from the center of rotation is small, and the lower centrifical forces generated by the slower RPM allows the engine to essentially function normally. It has been noted the engine functions progressively less normally at higher block RPMs likely due to adverse reaction to increasing centrifical forces acting upon the fuel/oil mixture. These small 2 cycle engines are significantly simpler than typical 2 cycle engines; the entire electrical system is removed and replaced by a glow plugs, and other exterior accessories, such as the starter, alternator, fuel pump etc, are eliminated.

No fully accessorized, full functioning, full scale counter-rotating engine has been successfully implemented commercially using 2 cycle reciprocating-piston configurations in spite of the theoretical application to aviation provided by this concept.

Therefore, there is still an opportunity for a better implementation of the counter-rotating piston engine approach for aviation propulsion. This invention is directed at providing a novel approach based on the redesign of the 2 cycle engine crankcase, and pistons to disallow the adverse accumulation of fluids during engine operation, and in doing so, to advantageously utilize the centrifical forces of the rotating block to aid in the transfer of fluids to the combustion chamber during operation.

BRIEF SUMMARY OF THE INVENTION

The primary goal of this invention is a two cycle engine propulsion system, especially for propeller driven aircraft, that balances opposing crankcase/crank torque and thereby transmits no resulting torque to the airframe.

Another objective is a counter-rotating engine wherein the engine components are designed to prevent the accumulation of fluids in engine cavities that, as a result of centrifical forces, hinder engine performance at the speeds necessary for (full scale/commercially viable) operation.

Another objective is a counter-rotating engine wherein the inside surfaces defining the crankcase volume are designed to utilize centrifical force to assist in the transfer of fluids from the crankcase to the combustion chamber.

Another objective is a counter-rotating engine wherein the inside surfaces defining the intake manifold volume are designed to utilize centrifical force to assist in the transfer of fluids from the crankcase to the combustion chamber such that no fluids can accumulate within the intake manifold.

Another objective is a counter-rotating engine wherein the piston is redesigned to include a port at the distal-most cavity, to allow for the transfer of all crankcase fluids to the combustion chamber, and specifically eliminate all fluids behind the piston capable of acting against the combustion function of the engine.

Another objective is a counter-rotating engine wherein the inside surfaces defining the crankcase volume are designed to utilize centrifical force to deliberately retard the transfer of fluids, and entrap small films of fluid at bearing locations to lubricate these bearing surfaces located throughout the engine without hindering engine performance.

Another objective of this invention is a throttle assembly integral to the spinning components of the engine located at or along the central axis including a carburetor which functions normally, utilizing typical venturi forces, substantially unaffected by centrifical force.

Another object of this invention is a hydraulic throttle assembly controlled through a stationary master cylinder communicating with a rotating slave cylinder, interconnected through rotary seals.

Another objective of the invention is a counter-rotating 2 cycle engine propulsion system, especially for propeller driven aircraft, with a combustion chamber assembly tortionally unrestrained from all engine accessories required for proper function except those components required to convert fuel combustion energy into a rotational force.

Another goal of the invention is a counter-rotating engine propulsion system, especially for propeller driven aircraft, that requires no additional unit for transmission or speed reduction for satisfactory propeller operation.

Another objective of the invention is a counter-rotating engine propulsion system, especially for propeller driven aircraft, that can be stably and safely journaled on a single axis.

Another goal is a counter-rotating engine propulsion system, especially for propeller driven aircraft, that eliminates the need for auxiliary engine cooling mechanisms by providing a combustion-chamber housing that includes external cooling fins which, during rotation of the housing, cause sufficient air movement across the cooling fins to adequately cool the combustion chamber.

Another objective of the invention is a counter-rotating 2 cycle engine wherein the engines carburetor and combustion air intake port is located either within the crankshaft or within the block along the counter-rotation axis of crankshaft/block therefore subject to little or no centrifical force, and a master/slave hydraulically actuated throttle mechanism controllable from a remote location.

Another objective of the invention is a counter-rotating 2 cycle engine including a multiple of cooperating pairs of pistons, wherein all piston pairs are normally aspirated through a single intake manifold ring specifically designed to centrificaly cause the flow of all fluids to the intake port without ponding.

Therefore, according to these and other objectives, one aspect of this invention consists of a counter-rotating 2 cycle-piston engine having an output shaft rotatably mounted to the frame of an aircraft. The engine block, is suitably journaled on the shaft to permit its counter-rotation. Internal combustion power is transmitted to the output shaft by means of one or more pistons slidably received within cooperating combustion chamber cylinders cooperatively connected to the crankshaft which translates expanding gas to rotational motion in the conventional manner, and according to the invention, produces concurrent rotation of the shaft and counter-rotation of the engine block. Dual propellers mounted on the shaft and on the block provide improved thrust performance, inherently balanced output torque and moments of inertia between the two counter-rotating masses, and virtually eliminate the transfer of torque to the aircraft. Also, according to the invention, the interior surfaces of the crankcase have been modified and a poston port added to facilitate the regular transfer of all engine fluids to the combustion chamber, and to eliminate the internal buildup of fluids which inhibit engine function during operation.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced. Boat propulsion and fluid pumps would be other examples.

DESCRIPTION OF THE PREFERRED EMBODIMENTS OF THE INVENTION

This invention lies in the recognition that a two cycle engine with an output shaft can be modified to facilitate the counter-rotation of the engine's combustion chamber about the same axis as the output shaft with propellers advantageously mounted on both the engine's output shaft and housing, respectively.

The primary aspect of this invention resides in the recognition that 2 cycle engines, absent of a constant reservoir of crankcase oil, provide an opportunity to counter rotate the crankcase and combustion chambers without the negative effects of uncontrolled crankcase oil under centrifical force.

Careful control of transient fluids inside the crankcase, under centrifical force, can enhance the fuel/oil flow performance. In the present invention, all internal surfaces of the counter-rotating crankcase facing the axis of rotation are angled away from the central axis to promote the unrestricted flow of accumulated oil radially away from the output shaft axis and toward the distal most cavity of the crankcase, located at the crankcase side of the pistons. The piston sidewall at the distal most surface of the piston includes a port leading to the combustion chamber transfer cavity within the sidewall of the cylinder. Combustion chamber transfer cavities are typical of two cycle engines. According to the invention, the atomized, and surface accumulations of crankcase fluids are systematically driven by centrifical force, into the combustion chambers located at the distal end of the cylinders for systematic combustion and exhaust.

Figure 1:
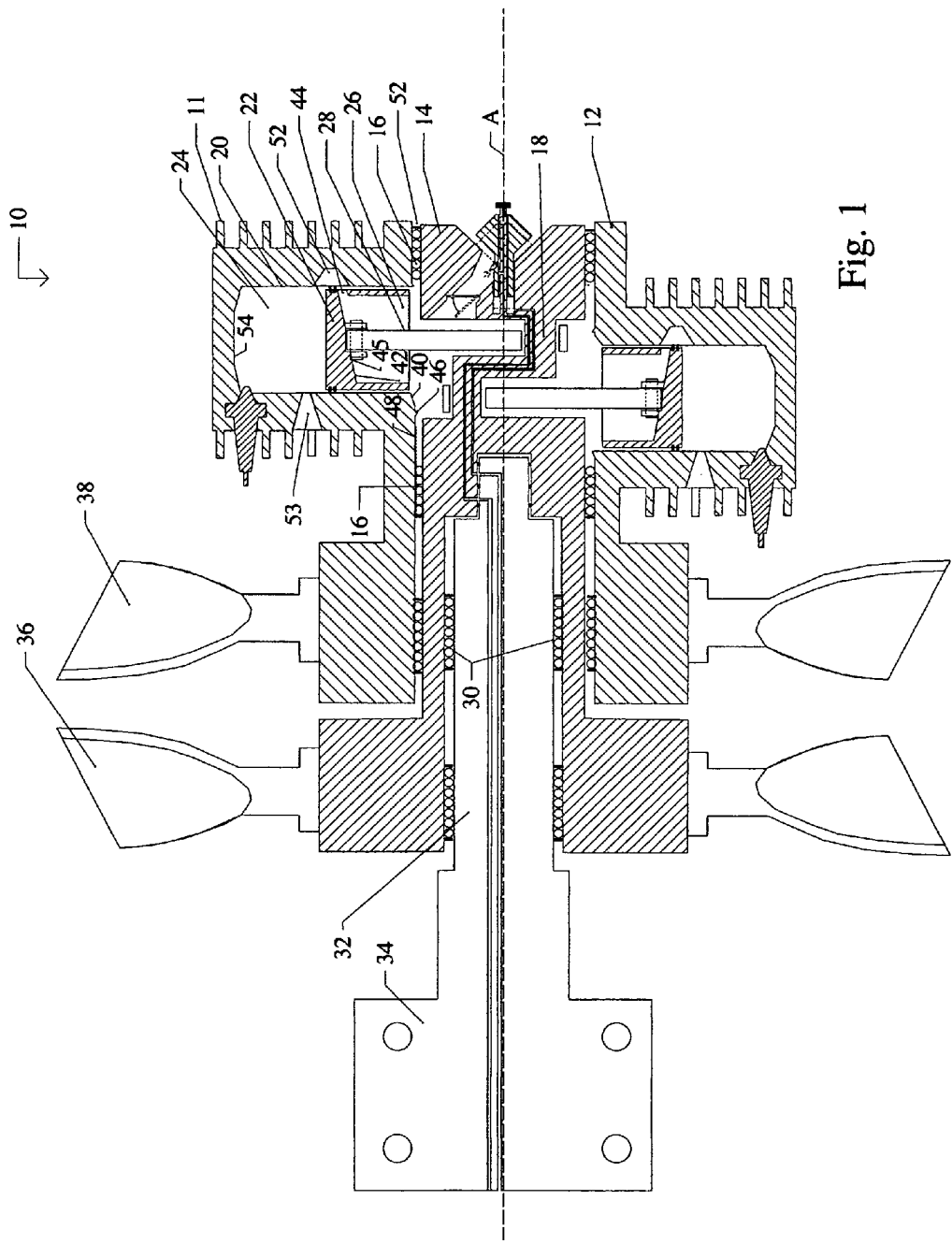
FIG. 1 is an axial section view of a counter-rotating dual-propeller 2 cycle dual cylinder simultaneously firing piston engine according to the present invention.
Figure 2:
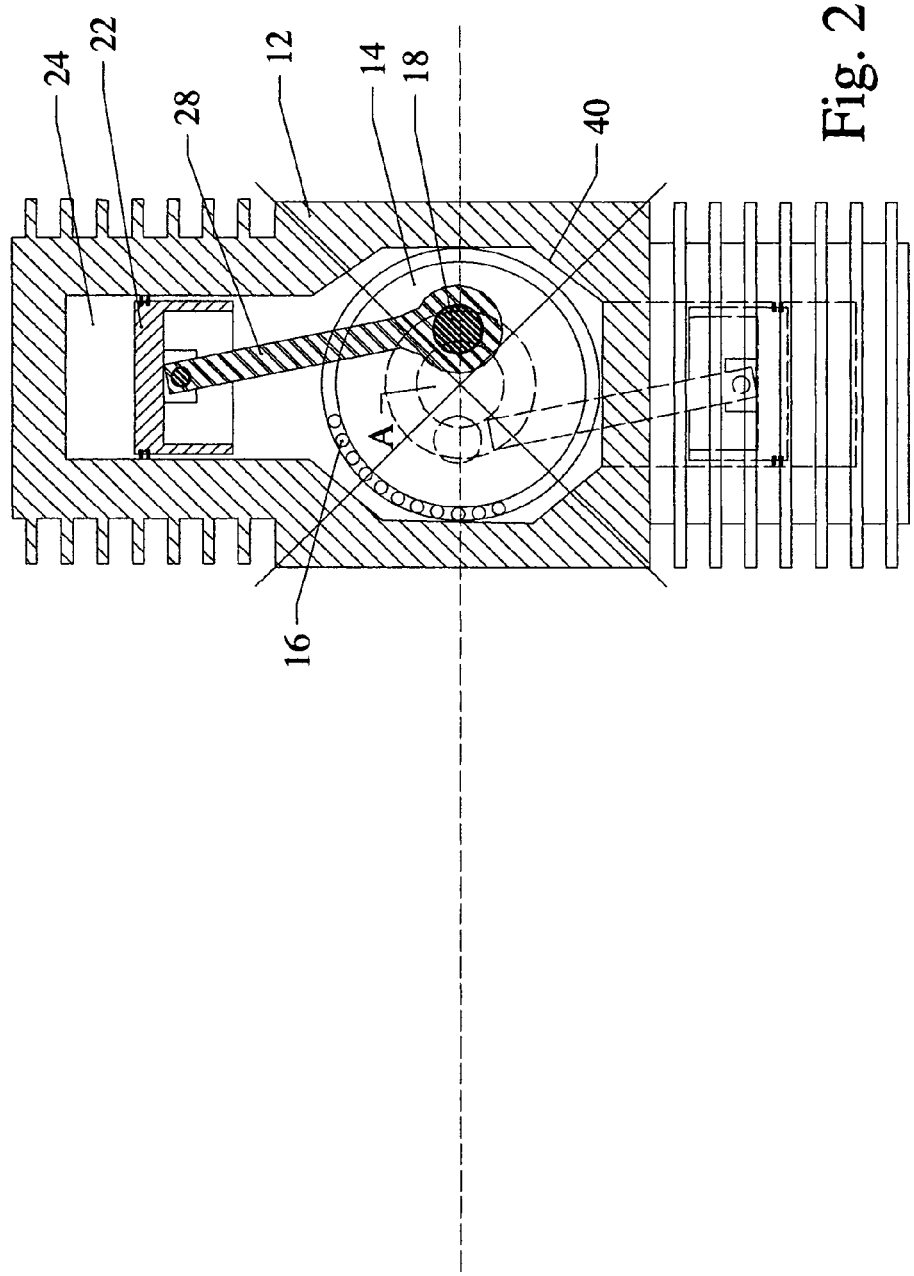
FIG. 2 is a sectional view of the engine of FIG. 1 as seen from line 2—2 in FIG. 1.

As illustrated in simple schematic form in the cross-sections of FIGS. 1 and 2, an engine 10 according to the invention comprises an engine block 12, centered around a central axis A, an output shaft 14 rotatably mounted through the block 12, through annular bearings 16, to rotate about the central axis A. The engine block 12 houses a volume 26 including the eccentric journals 18 along the output shaft 14 and one or more cylinders 20 oriented radially away from, and equally spaced around, the central axis A. The engine 10 includes one or more pistons 22 each slidably mounted to a corresponding cylinder 20 subdividing combustion chamber volumes 24, from the crankcase volume 26. Each piston has an associated connecting rod 28 journaled at one end, about an axis parallel to axis A, to a piston 22, and journaled at the other end to a cooperating output shaft eccentric 18. As shown in the drawings, the engine block 12 rotatably mounted about the output shaft 14, through annular bearings 16, rotatable as well about the central axis A. The output shaft 14 is rotatably mounted through annular bearings 30, to a stationary spindle 32 including a mounting block 34. The mounting block is illustrated on one side of the engine in FIG. 1, but, as one skilled in the art would readily understand, it could equivalently be placed on the other side, or on both sides of the engine. A first propeller 36 (shown partially cut-out in the figure) is fixed to an open portion of the output shaft 14 to convert its rotation into useful propulsion. A second propeller 38 is fixed to an open portion of the engine block 12 to convert its opposing rotation into useful propulsion.

It is noted that as a result of this configuration each propeller 36,38 rotates around the engine's central axis about the structure to which it is attached (i.e., the shaft 14 and the block 12, respectively) and that the relative motion of the two is generated by the way the shaft 14 and block 12 are rotatably interconnected to the combustion chamber action. The relative motion of the block and crankshaft balance themselves automatically according to the mass, geometry, and dynamic resistance of the respective rotating structures.

The significant contributions of the present invention are improvements to a conventional two cycle engine configuration; accordingly, some conventional two cycle engine configurations will not be described in detail here beyond what is necessary to disclose the novelties of the invention.

Figure 3:
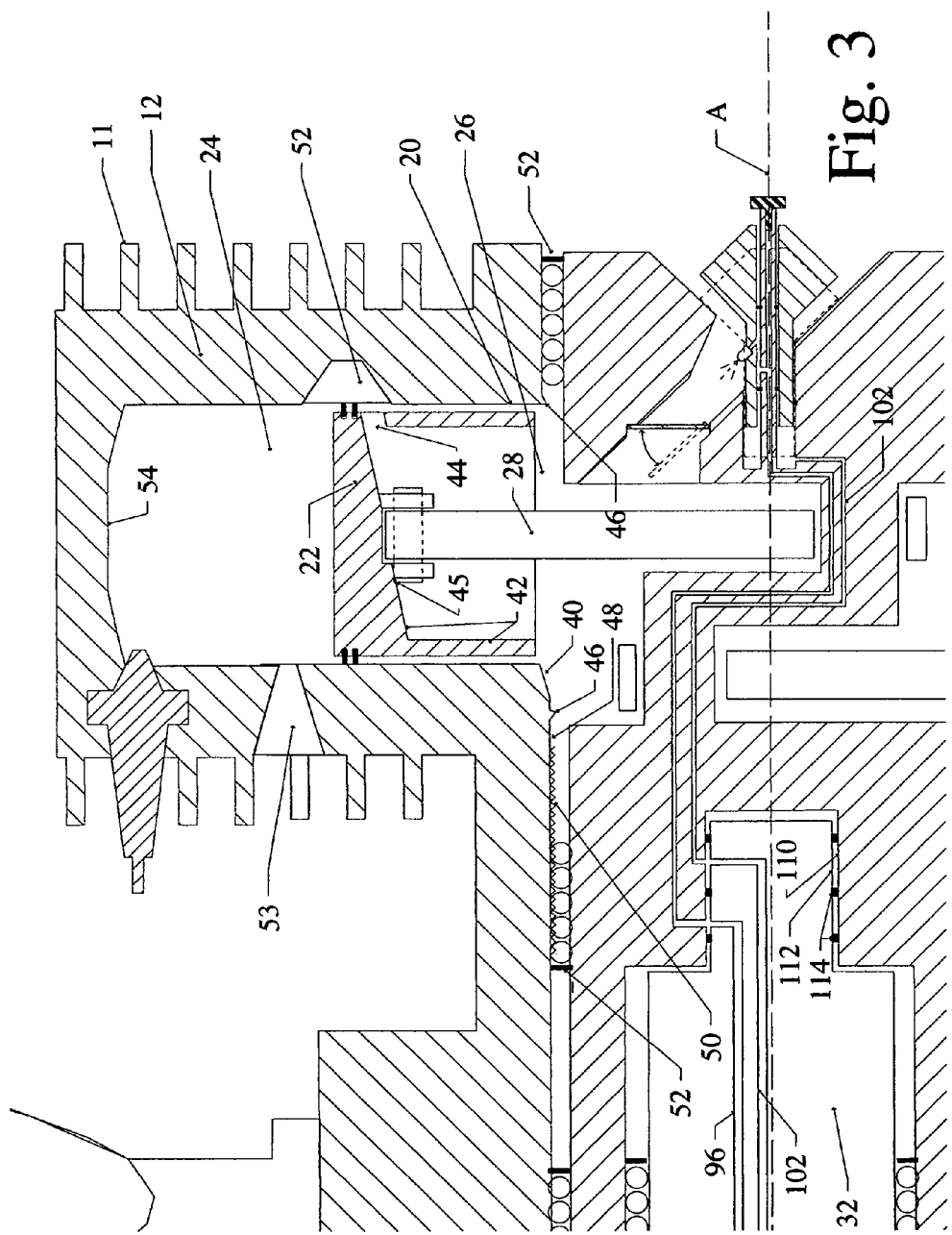
FIG. 3 is an enlarged view of the portion of FIG. 1 showing the fluid flow surface features on the interior of the crankcase chamber according to the invention.

Referring to the enlargement FIG. 3, a significant contribution of the present invention, which becomes necessary because of the preferred engine mounting approach shown in FIG. 1, are the improvements to the inside surfaces of the crankcase housing 40, the pistons 42, and the combustion chamber 54 to control fluid buildup. All inside faces 40 of the crankcase housing 12 which face the central axis, are distally pitched to allow surface fluid flow away from the central axis A and toward the cylinders 20. Distally pitched surfaces 40 are angled either, toward the radially positioned cylinders 20, or toward adjacent distally angled surfaces, located further away from the central axis and angled toward the radially positioned cylinders, to enable an unrestricted surface flow of fluids toward the cylinders 20. Similarly, angled piston surfaces 42 exposed to the crankcase volume are oriented toward a piston head duct 44 located at the distal-most corner of the piston 22. Optionally, rotatably journaled surfaces between the rod 28 and the piston 22 can be located tangent 45 to the angled piston surfaces 42 to promote journal lubrication by surface flow oil. Similarly Fluid entrapping ridges 46 are located on non-reciprocating bearing surfaces 48 exposed to the combustion chamber 26 and parallel to and facing the central axis A, to temporarily encourage a transit lubricating oil fluid film 50 buildup at shaft bearings 16. Trapped oil which is evenly distributed at the journal surface 16 generates no uneven fluid/weight imbalance. Oil seals 52 contain the lubricating fluid film inside the combustion chamber volume 26. Overflow of the transit lubricating oil flows, according to the invention, toward the cylinders 20.

Still referring to FIG. 3, the piston duct 44 is cooperationally located along the path of the cylinder wall, piston bypass, intake duct 52, typical to two cycle engines. This normally allows for the intake of atomised fuel, and according to the invention also allows for the regular transfer of surface accumulations of crankcase fluids into the combustion chamber 24 as well. An exhaust port 53 open to the atmosphere allows exhaust to escape the combustion chamber 24 at appropriate times during engine operation. The exhaust port 53 is advantageously located toward the direction of propeller thrust and/or opposite the direction of block rotation to enhance the engine operation and/or thrust.

Angled combustion chamber surfaces 54 are located at the distal most surface of the combustion chamber to distribute combustible fluids to or near the ignition source for optimum combustion.

Still referring to FIG. 3 As those familiar with the art of two cycle engines recognize, a port connecting the atmosphere with the crankcase cavity allows air to be drawn into the expanding crankcase volume 26 during the compression phase of the combustion chamber volume 24 during normal engine operation.

Figure 4:
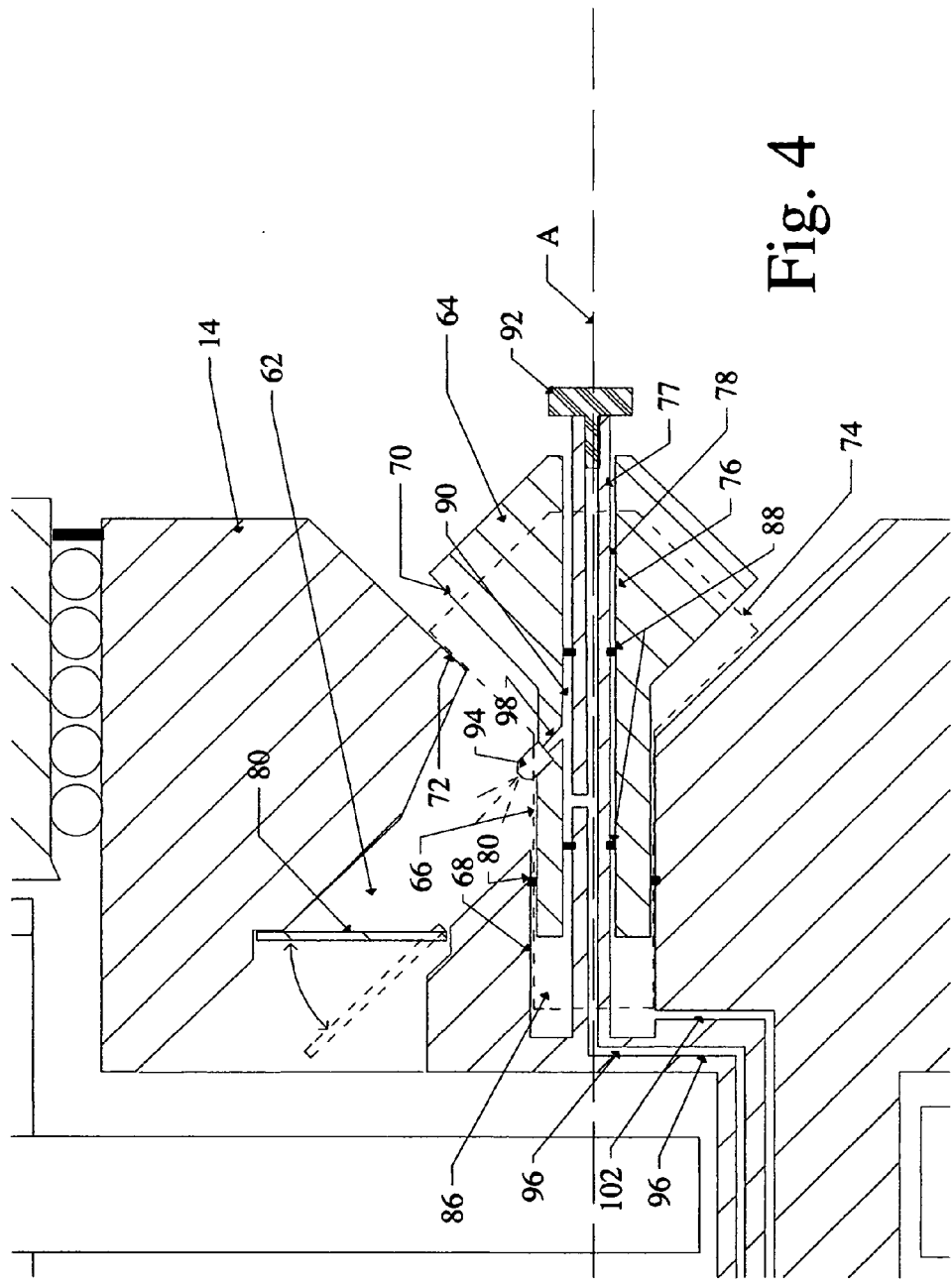
FIG. 4 is an enlarged view of a portion of FIG. 3 showing the throttle assembly and porting of the fuel system

Referring to FIG. 4, another contribution of the present invention recognizes the need to locate the carburetor fuel line 96 terminating at the throttle 64 located at or near the engine 10 axis of rotation A to minimize or eliminate centrifical forces from interfering with the normal carburetor venturi and vacuum forces which draws fuel into the passing intake air for combustion. Additionally, the need exists to be able to remotely throttle the intake duct 62 by non-rigid mechanical means. It is understood the intake duct 62 leading to the crankcase, can either be routed through the crankshaft, through the block, or both. The preferred embodiment shown locates the intake duct through the crankshaft. For engines with more than one set of simultaneously firing pistons, a cooperating duct and reed valve connecting the throttle 64 to the crankcase for the additional set of cylinders is necessary.

Referring to FIG. 4, the present invention integrates an inlet duct 62 within a free portion of the output shaft 14 at or near the central axis A. A slid-ably operating throttle 64 centered about the central axis A consists of, at one end, a cylindrical profile 66 concentric to the central axis slide-ably received within a cylindrical cavity 68 located within an open portion of the output shaft 14 also concentric to the central axis A. At the other end of the throttle 64, is a throttle mating surface 70 formed to mate with a corresponding intake port mating surface 72 located along the intake duct 62 portion of the output shaft 14 such that the throttle 64, in a retracted position 74 substantially obstructs the intake port 62. The cylindrical profile 66 of the throttle 64 includes a cylindrically shaped surface 76, concentric to the central axis A, and slidably cooperative with at the outside surface 78 of a tubular fuel line 77 which is integral to the output shaft 14 and concentric to the central axis A. An annular fluid seal 80 prohibits the bypass of fluids between cooperating cylindrical surfaces 66 and 68 and defines a volumetrically variable Slave reservoir 86. Similarly, a pair of annular fluid seals 88 located between the cylindrical surfaces 76 and 78, additionally described to be located at either end of the slidably cooperational range of the tubular fuel line 77, and the throttle 64, and located on either side of a fuel duct 97. The fluid seals 88; prohibit the by pass of fluids between surfaces 76 and 77, enclose a volume 90 including ports 98 and 97, and allow a full operational range of throttle valve 64 motion without changing the trapped fuel volume 90. Again the fuel volume 90 is defined as the volume between cylindrical surfaces 76/78 and between the pair of annular fluid seals 88. A threaded fastener 92 attached to the open end of the fuel tube 78 seals the end of the tube and defines the fully extended range of motion permitted by the throttle valve 64.

A fuel atomization nozzle 94 is attached to the throttle valve 64 directed toward the crankcase side of the intake port 62. A fuel port 97 interconnects the fuel supply line 96 with the trapped fuel volume 90. Another fuel port 98 interconnects the trapped fuel volume 90 with the atomization nozzle 94

Still referencing FIG. 4, a barometric pressure operated reed valve 80 located within and pivot-ably mounted to the output shaft 14 provides a barametrically sequenced opening and closure of intake port 62 during normal engine operation.

A hydraulic fluid port 102 interconnects the hydraulic slave reservoir 86 with a remote throttle master cylinder reservoir 104 (not shown), and a fuel port 96 interconnects the fuel supply slide tube 77 with a remote fuel tank (not shown).

Referring to FIG. 3 The output shaft 14 has a cylindrical surface 110 concentric to the central axis A cooperatively adjacent to a cylindrical surface 112 on the stationary spindle 32. Annular fluid seals 114 maintain separated fluid continuity across rotating surfaces 110 and 112.

In addition, as illustrated in the sectional view of FIGS. 1,2,&3, the block 10 is also preferably provided with radiator fins 11 projecting from the outer surface of the combustion chamber 12. Thus, the heat exchange resulting from the combined interaction of the rotating fins 11 with the ambient air provides cooling to the engine. The fins 11 are preferably disposed at an angle with respect to the axis A of the engine, so as to provide a fan effect designed to continually pump ambient air past themselves for cooling as well as to enhance the efficiency of the propeller 36 associated with the rotating housing of the engine.

Figure 5:
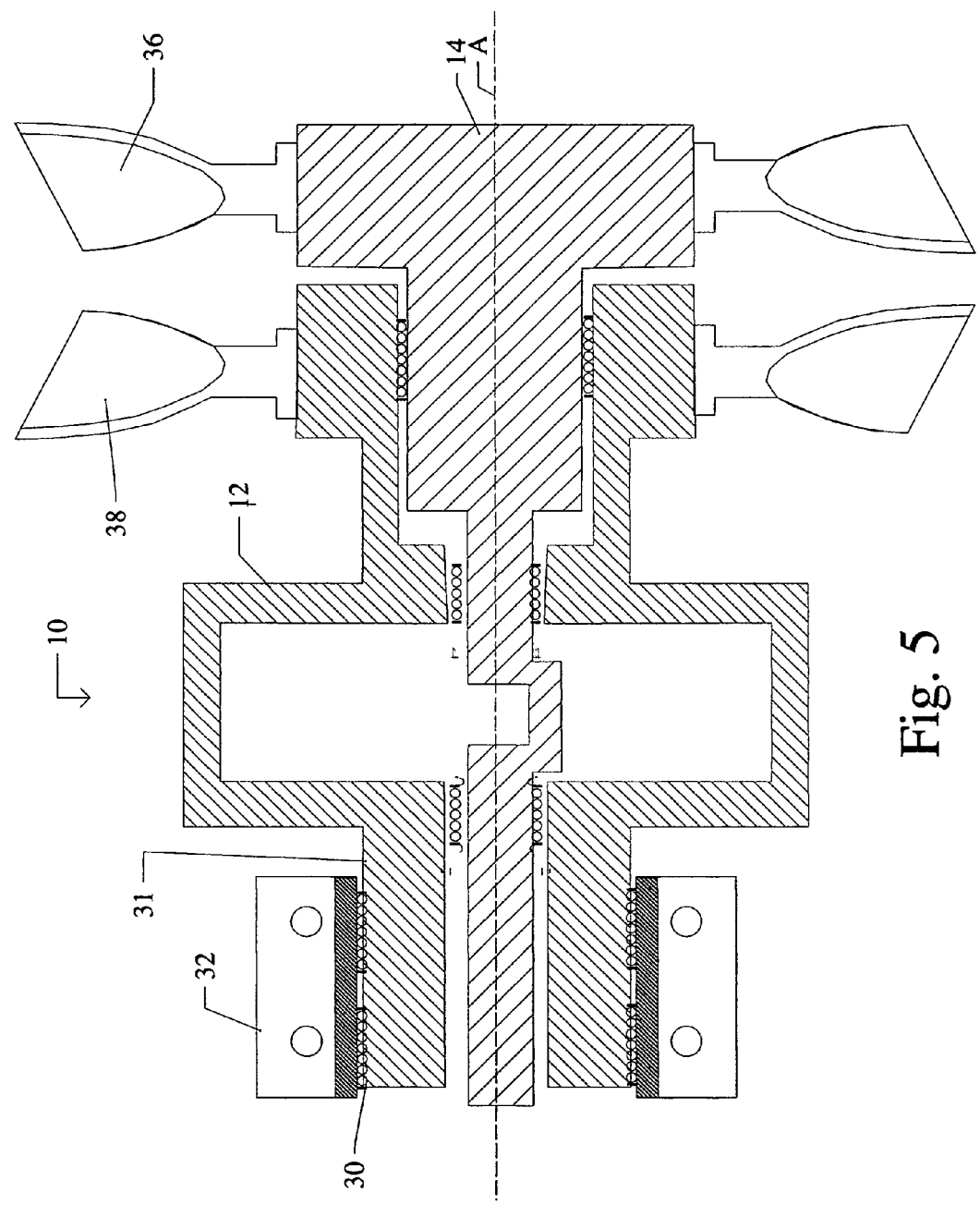
FIG. 5 is a sectional view illustrating an alternate block mount configuration.

FIG. 5 schematically illustrates an engine 10 wherein the block 12 and corresponding propeller 38 are rotatably mounted on a stationary structure 32 through bearings 30 that surround a cylindrical outer surface 31 of the block. In turn, the output shaft 14 is journaled within the block 12, as in the previous embodiments, thereby allowing the corresponding propeller 36 to counter-rotate with respect to the block.

Figure 6:
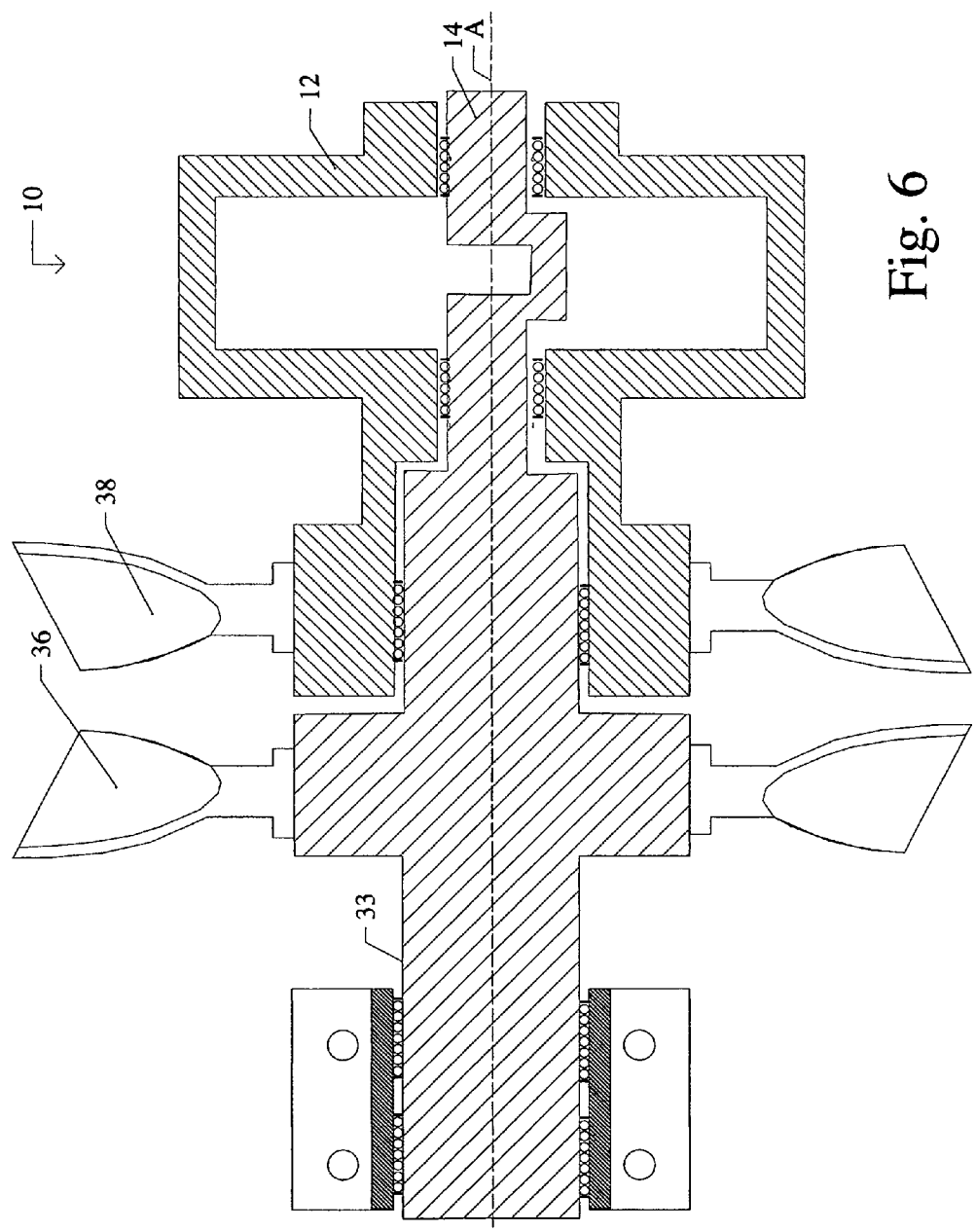
FIG. 6 is a sectional view illustrating an alternate crankshaft mount configuration.

Similarly, FIG. 6 schematically illustrates an engine 10 wherein the crankshaft 14 and corresponding propeller 36 are rotatably mounted on a stationary structure 32 through bearings 30 that surround a cylindrical outer surface 33 of the crankshaft 14. In turn, the block 12 is journaled around the crankshaft 14, as in the previous embodiments, thereby allowing the corresponding propeller 38 to counter-rotate with respect to the crankshaft.

Figure 7:
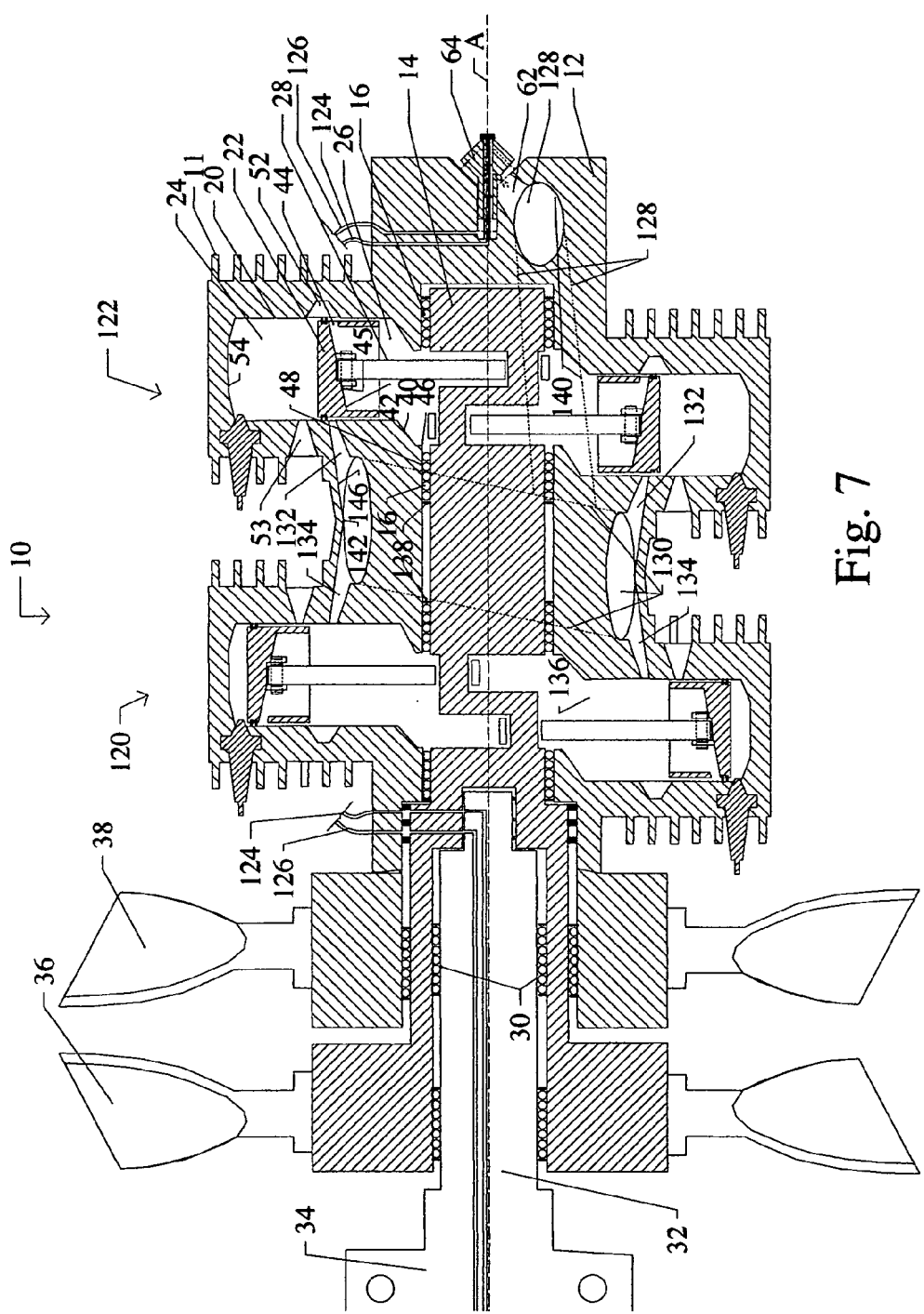
FIG. 7 is a section view illustrating an engine including two cooperating pairs of cylinders and a common intake manifold.

Referring to FIG. 7 the preferred embodiment includes engine configurations including two or more cooperating sets of pistons. Within each piston/crankcase set such as 122, the pistons are horizontally opposed and common to a single crankcase volume. For multiple sets of pistons, the intake port 62 is located with in the block 12 concentric to the central axis A. The hydraulic throttle control line 102 and the fuel line 96 leading to the block mounted throttle 64 is transferred from the stationary spindle 32 through the crankshaft 14, through the block 12, to a pair of fluid transfer lines 124 and 125, leading to the throttle 64. The Fuel/air mixture flows from the intake port 62 which is open to a fuel/air intake duct 128 leading to a cylindrically shaped intake manifold 130 which in turn is open to intake ports 132 and 134. which lead to individual crankcase volumes 26 and 136. Typical to all piston/crankcase sets such as 122, the pistons 22 serve as intake valves by blocking the intake ports 132 during all cycles of the engine operation except during the maximum combustion chamber compression cycle wherein the piston 22 by-passes the intake port 132 allowing low pressure within the crankcase volume 26 to draw the in intake fuel/air mixture. The piston valve intake configuration is known to those familiar with in the art.

Still referring to FIG. 7, in the case of all multi-piston/crankcase set engine configurations, shaft bearings 16 and crankcase seals 138 are required to separate independent crankcase volumes such as 26 and 136. Crankcase seals 138 are positioned to allow bearings 16 to be open to one crankcase volume 26 for lubrication.

Referring to FIG. 3 for detail, as previously described, fluid entrapping ridges 46 may be located on non-reciprocating bearing surfaces 48 exposed to the combustion chamber 26 and parallel to and facing the central axis A, to temporarily encourage a transit lubricating oil fluid film 50 buildup at shaft bearings 16.

Referring to FIG. 7, a contribution of this invention includes the form of the interior distal surfaces 140 of the intake duct 128 to be angled progressively away from the central axis A, as it leads from the intake port 62, to the manifold ring 130. The sloping interior distal surfaces 140 of the intake duct 128 away from the central axis A insures fluid flow centrifically and avoids fluid ponding which may cause imbalances under centrifical forces. The interior distal surfaces 142 of the manifold ring 130 are equidistant to the central axis A, to promote even flow through the manifold ring 130 without fluid ponding at distal surfaces due to centrifical force. Typical to all piston/crankcase sets such as 12, the interior distal surfaces 146 of the intake port 132 are angled toward the pistons 22 and toward the crankcase volume 26.

Figure 8:
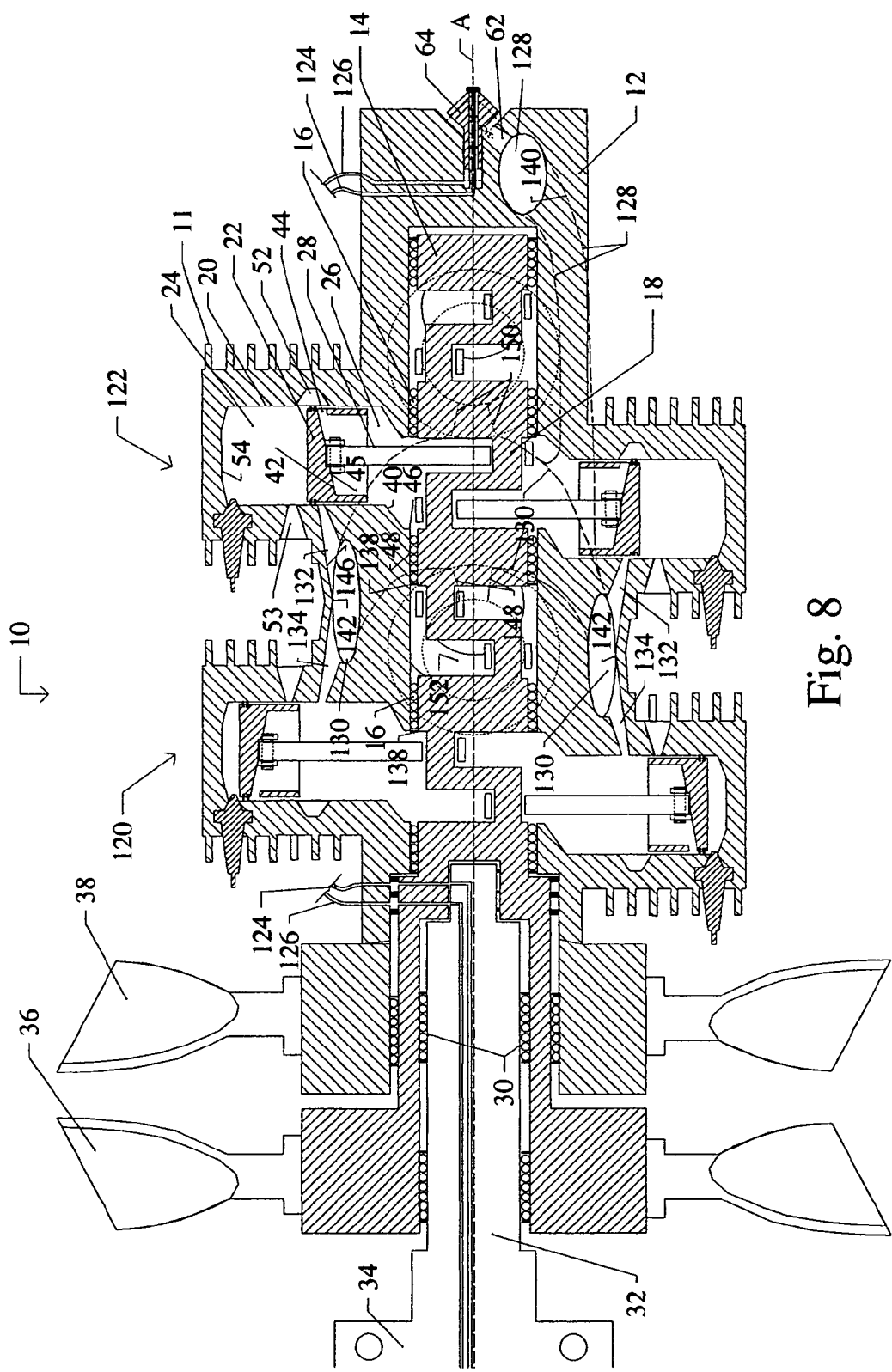
FIG. 8 is a section view illustrating an engine including four cooperating pairs of cylinders and a common intake manifold.

The preferred embodiment includes engines containing two or more cooperating piston/crankcase sets such as 122, wherein the piston/crankcase sets are rotated relative to each other about the central axis a. Again typical to each set, cooperating pistons are horizontally opposed and common to a single crankcase volume. FIG. 8 describes an intake duct 128 and manifold ring 130 with interior distal surfaces 140 and 142 respectively as described in FIG. 7. In addition, the modified manifold ring 130 of FIG. 8 is distorted to provide access to all crankcase volumes through intake ports 132, 134 as shown, and 148 and 150 as shown for the near pistons indicated by a dotted line shown. The modified manifold ring 130, equally accesses combustion chambers 26, 136, 152 and 154.

Although not shown, within the preferred embodiment three or more pistons could be arranged around a very complicated crankshaft, all simultaneously firing, to describe a 2 cycle engine with three or more cylinders, Additionally two or more sets of cylinders, each set having an isolated crankcase volume and an independent intake port may be implemented to sequence the ignition of each set equally apart from each other for smoother operation, in this case through-the-block intake porting is preferred to allow a single source carburetor to fuel both sets of pistons through a manifold common to both sets of intake ports.

Finally, to those familiar in the art, 2 cycle engines do not necessarily require standard ignition systems to operate. Glow plugs are used in place of conventional magneto, coil or capacitor discharge ignition systems. Although not shown and not fully described in the preferred embodiment, Solid state magneto ignition systems, magnetically driven capacitor discharge ignition systems, could be conventionally mounted between the block 12 and the crankshaft 14.

Similarly, engine starter systems and electricity generator systems are not required for conventional 2 cycle engines to operate and therefore are not fully described in the preferred embodiment.

Other, non-glow plug, ignition systems have been described in a separate patent submittal dated 15 Nov. 2003 and named "An adapter to interface counter rotating torque producing engine mechanisms with stationary support accessories".

Thus a novel counter-rotating two cycle engine has been described including opposed and simultaneously firing cylinders. The engine includes a crankshaft, and an improved engine block both rotatably mounted about the same axis and both connected to corresponding propellers. Internal combustion power is transmitted to the crankshaft by means of two or more pistons, each slidably received within cooperating combustion chamber cylinder operatively connect to the crankshaft through a connecting rod which cooperates in conventional manner producing concurrent rotation of the crankshaft and counter-rotation of the engine block. The invention includes modifications to the interior surfaces of the crankcase, and a modified piston to include a port, all added to facilitate the regular transfer of engine fluids to the combustion chamber, and to eliminate the internal buildup of fluids which inhibit engine function during operation.

A combustion air intake port and hydraulically actuated throttle assembly located at the axis of rotation cooperates with a combustion air intake port which fluidly connects ambient air with the crankcase volume. The route of the intake port can be integral to either the crankshaft or the engine block The rotating throttle components are serviced through a plurality of hydraulic rotating shaft seals, to provide continuous flow of fuel mixture and hydraulic continuity between the throttle master and slave cylinders, and rotating electrical contacts for electrical grounding and sensors Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. An engine with counter-rotating housing and output shaft, comprising the following combination of components:
    a) A 2 cycle engine block rotatably mounted to allow rotation around the crankshaft center axis,
    b) Two or more, simultaneously firing, cylinders radially attached to a cooperating crankcase, equally spaced around the cooperating crankshaft, each cylinder aligned to a cooperating off-set journal on the crankshaft c) a crankshaft, journaled at either end to the block, concentric with the central axis, including two or more off-set bearing surfaces, contained within the crankcase, wherein each off-set cooperatingly aligns to a corresponding cylinder d) Two or more connecting rods each journaled at one end to a crankshaft off-set surface and journaled at the other end to the crankcase side of an individual piston e) Two or more pistons each slidably received within a corresponding cylinder f) each combustion chamber arrangement including a spark plug located within the combustion chamber at full compression but not at an outer most cavity subject to centrifical force fluid ponding during crankcase rotation g) a crankcase volume which expands and contracts during operation either systematically intaking through a carburetor or similar device a measured amount of fuel/air/oil mixture into the crank case, or systematically transferring a measured amount of the same fuel/air/oil mixture to the combustion chamber through a cavity in the cylinder wall which allows the fuel/air/oil volume to bypass the piston compression rings (h) means for producing said concentric rotation and counter-rotation as a result of a process of energy conversion;

whereby during operation of the engine an inertial balance is established between said output shaft and said housing by rotating in opposite directions concentrically with respect to said engine center line.

2. The engine of claim 1, wherein the crankcase side of the reciprocating piston(s) are tapered toward a transfer port through the side of the piston wall, in alignment to the intake duct, at the centrifugal extremity of those piston surfaces, wherein the piston port aligns with the piston by-pass intake duct to allow for the centrifugal transfer of accumulating fluids through the piston port and bypass duct leading to the combustion chamber for subsequent burning and eventual exhaust from the engine.

3. The engine of claim 1, wherein the inside surfaces of the crank case subject to centrifical fluid ponding are either tapered surfaces to allow for unrestricted flow to the extreme volumes of the crankcase being the crankcase side of the pistons for systematic transfer to the combustion chamber, or are minimally cavitated surfaces to specifically pond enough fluids to lubricate bearings and journaled surfaces of non-reciprocating components without causing an imbalance of the crankcase due to ponded fluid weight.

4. The engine of claim 1, further including inside crankcase minor ridges at non-reciprocating journaled surfaces open to the central axis, which allows for specific centrifical force ponding of a small amounts lubricating fluid, present in the fuel/air/oil mixture, to be trapped at the non-reciprocating bearing points within the crank case and which allows for the sheet flow of oils to pass through but not pond at the bearing surfaces within the crank case which do reciprocate.

5. The engine of claim 1, wherein said engine is a 2 cycle-piston engine and said process of energy conversion includes combustion of a fuel in a combustion chamber; and wherein the engine further includes lubrication surfaces which allows for the sheet flow of oils to pass through but not pond at the bearing surfaces between components which do reciprocate.

6. An engine of claim 1 including a throttle mechanism located at the center of rotation, operated by a typical hydraulic master/slave cylinder connection which allows carburation to occur normally, unaffected by the centrifical forces of its own rotation.

7. An engine of claim 1 including a plurality of cooperating pairs of cylinders fueled by a single carburetor.

8. The engine of claim 1, wherein during normal engine operation, fluids transfer from crankcase to combustion chamber under centrifugal force.

9. The engine of claim 1, wherein during normal engine operation, fluids transfer from intake manifold to crankcase under centrifugal force.

10. The engine of claim 1, wherein crankcase fluids are centrifugally trapped at non-reciprocating bearing surfaces for lubrication purposes but in insufficient quantities to cause engine imbalance.

11. The engine of claim 1 wherein engine cooling is achieved by forcefully rotating engine block through otherwise still ambient air.

12. The engine of claim 1, wherein angle mounted exterior cooling fins are integral to the engine block, wherein during engine/crankshaft counter-rotation, air for cooling is to continuously drawn across cooling fins by both block toward fresh ambient air.

13. The engine of claim 1, wherein crankshaft mounted propeller air rotation speed reductions are automatically achieved by engine block counter-rotation while maintaining crankshaft/block engine operating speeds.

14. The engine of claim 1, wherein engine block and or engine crankshaft rotation speed can be adjusted by changing the dynamic load, geometry or mass of either, or both, rotating components.

15. The engine of claim 1, wherein inside crankcase surfaces are either
   1) distally pitched toward the cylinders or toward cooperating adjacent surfaces located farther away from the engine axis of rotation whose surfaces are similarly pitched toward the cylinders or toward cooperating distally pitched surfaces ultimately leading to the cylinders, or
   2) contoured to centrifugally trap minor amounts of fluid accumulations at non-reciprocating bearing surfaces.

16. The engine of claim 1, one or more distally pitched interior crankcase surfaces are located tangent to reciprocating bearing surfaces to promote bearing lubrication by centrifugal force driven surface flows of crankcase fluids.

17. The engine of claim 1, wherein a carburetor intake port is located concentric to the engine center of rotation and wherein carburetor moving parts such as the throttle are concentrically balanced about the center axis to operate along the center axis unaffected by centrifugal force.

* * * * *